United States Patent
Yun et al.

(10) Patent No.: US 12,370,871 B2
(45) Date of Patent: Jul. 29, 2025

(54) DOOR CONNECTING DEVICE FOR VEHICLE

(71) Applicants: Hyundai Motor Company, Seoul (KR); Kia Corporation, Seoul (KR)

(72) Inventors: Hyungin Yun, Seoul (KR); Chungsik Yim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 17/979,543

(22) Filed: Nov. 2, 2022

(65) Prior Publication Data

US 2023/0322054 A1     Oct. 12, 2023

(30) Foreign Application Priority Data

Apr. 7, 2022  (KR) .......................... 10-2022-0043386

(51) Int. Cl.
*B60J 5/04* (2006.01)

(52) U.S. Cl.
CPC .................................. *B60J 5/0479* (2013.01)

(58) Field of Classification Search
CPC ............ B60J 5/0479; B60J 2005/0475; E05Y 2201/654; E05Y 2900/531; E05F 7/04; E05F 7/00; E05B 83/38; E05B 85/00; E05D 15/48; E05D 2015/485
USPC .......................................................... 49/503
See application file for complete search history.

(56) References Cited

U.S. PATENT DOCUMENTS

| | | | | |
|---|---|---|---|---|
| 5,749,611 A | * | 5/1998 | Watson | B60J 5/0479 292/336.3 |
| 2002/0027375 A1 | * | 3/2002 | Wattebled | E05B 83/40 296/146.1 |
| 2021/0172237 A1 | * | 6/2021 | Choi | E05D 15/48 |
| 2021/0372173 A1 | * | 12/2021 | Okeke | E05B 85/04 |
| 2022/0243502 A1 | * | 8/2022 | Itonaga | E05B 79/20 |
| 2022/0349222 A1 | * | 11/2022 | Roeder | E05B 81/90 |
| 2022/0349223 A1 | * | 11/2022 | Roeder | E05F 15/655 |
| 2023/0203855 A1 | * | 6/2023 | Kim | E05B 85/26 292/200 |
| 2023/0322054 A1 | * | 10/2023 | Yun | E05F 7/04 |
| 2024/0254812 A1 | * | 8/2024 | Seo | E05B 81/34 |

FOREIGN PATENT DOCUMENTS

| | | | | | |
|---|---|---|---|---|---|
| CN | 112677744 A | * | 4/2021 | | B60J 5/06 |
| CN | 113445834 A | * | 9/2021 | | E05B 77/08 |
| CN | 107642286 B | * | 10/2021 | | E05B 77/44 |
| DE | 102019130760 A1 | * | 12/2020 | | B60J 5/0479 |

* cited by examiner

*Primary Examiner* — Jason W San
(74) *Attorney, Agent, or Firm* — Morgan, Lewis & Bockius LLP

(57) ABSTRACT

A door connecting device for a vehicle to which opposite swing doors including a rear door and a front door is applied, the opposite swing doors being configured to be opened or closed by a relative movement between the rear door and the front door, includes a lever rotatably mounted on one of the front door and the rear door and configured to be rotated by the relative movement between the rear door and the front door; a catcher disposed on one of the front door and the rear door and configured to rotate in conjunction with a rotation of the lever; and a cable connecting the lever and the catcher and configured to transmit a rotation force caused by the relative movement to the catcher when the lever rotates.

11 Claims, 8 Drawing Sheets

DOOR CONNECTING DEVICE FOR VEHICLE

CROSS-REFERENCE TO RELATED APPLICATION

The present application claims priority to Korean Patent Application No. 10-2022-0043386 filed on Apr. 7, 2022, the entire contents of which is incorporated herein for all purposes by this reference.

BACKGROUND OF THE PRESENT DISCLOSURE

Field of the Present Disclosure

The present disclosure relates to a door connecting device for a vehicle, and more particularly, to a door connecting device for a vehicle that connects a front door and a rear door of a vehicle to which opposite swing doors are applied without a B-pillar.

Description of Related Art

In general, a door of a vehicle separates the inside and outside of the vehicle and performs important functions of blocking external noise, rainwater, dust, wind, and the like and safely protecting an occupant by absorbing impact together with a side structure in the event of a broadside collision.

There are various types of doors for a vehicle including doors for special purposes. However, hinge type swing doors are widely used for passenger vehicles.

Typically, the swing door refers to a door which is opened toward the outside of a vehicle body about a hinge shaft provided by a hinge bracket disposed between the swing door and the vehicle body. The advantage of the swing door is that the swing door is easily opened or closed and has a simple structure, which makes it easy to maintain and repair the swing door.

Meanwhile, opposite swing doors are applied to some vehicles. The opposite swing doors provide wide openness when opened and make it easy for the occupant to get in or out of the vehicle. The opposite swing doors are classified into a type having no B pillar and a type having the B pillar.

FIG. 1 is a side view exemplarily illustrating a vehicle to which opposite swing doors are applied with a B-pillar in the related art. Referring to FIG. 1, a front upper latch 4 and a front lower latch 5 are respectively provided at upper and lower sides of a front door 4 to maintain a state of being locked to the B-pillar. A rear lower latch 6 is provided at a lower side of a rear door to maintain a state of being locked to the B-pillar.

In case of the vehicle to which the opposite swing doors are applied with the B-pillar as described above, the doors may be kept locked to the B-pillar only by the latches provided at the upper and lower sides of the front door and the rear door, and thus there occurs no problem of sagging of the doors or the separation between the doors. However, in case of a vehicle to which opposite swing doors are applied without a B-pillar nor a latch structure, there is no structure for connecting a front door and a rear door. For the present reason, there is a problem in that the front door and the rear door sag or are separated when a load exceeding strength of a ceiling or strength of a side door is excessively applied.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door connecting device for a vehicle that includes a lever and a catcher to connect a front door and a rear door of a vehicle to which opposite swing doors are applied without a B-pillar.

An exemplary embodiment of the present disclosure provides a door connecting device for a vehicle to which opposite swing doors including a rear door and a front door is applied, the opposite swing doors being configured to be opened or closed by a relative movement between the rear door and the front door, the door connecting device including: a lever rotatably mounted on one of the front door and the rear door and configured to be rotated by the relative movement between the rear door and the front door; a catcher disposed on one of the front door and the rear door and configured to rotate in conjunction with a rotation of the lever; and a cable connecting the lever and the catcher and configured to transmit a rotation force caused by the relative movement to the catcher when the lever rotates.

When the rear door and the front door are opened, a first end portion of the lever may protrude toward the front door, and a second end portion of the lever may be connected to the cable.

When the rear door and the front door are coupled, the lever may operate so that the first end portion of the lever rotates while coming into contact with an end portion of the front door.

The lever may be configured to rotate about a rotation shaft between the first end portion and the second end portion of the lever, an elastic member may be provided on the rotation shaft, and the elastic member may provide an elastic force to allow the first end portion of the lever to protrude toward the front door when the rear door and the front door are opened.

The elastic member may be a coil spring wound around the rotation shaft.

The lever may be provided on a lever bracket connected to the rotation shaft, and the lever bracket may be provided on the rear door.

The cable may be configured to be pulled by a rotation of the lever and rotate the catcher in a rotation direction of the lever.

The cable may be connected to a holder provided at one end portion of the catcher, and when the cable is pulled, the holder may rotate, and the holder may rotate the catcher.

The catcher may be provided on a catcher bracket connected to a rotation shaft at the other end portion of the catcher, and the catcher bracket may be provided on the rear door.

One end portion of the catcher may rotate about the rotation shaft at the other end portion of the catcher to be inserted into an insertion hole provided at an end portion of the front door when the rear door and the front door are coupled.

A reinforcement may be provided inside the insertion hole and support one end portion of the catcher.

Two opposite end portions of the lever may each have a rounded shape.

The lever and the catcher may be provided at an end portion of the rear door, and the lever may be disposed below the catcher.

According to the exemplary embodiment of the present disclosure, the structure for connecting the front door and the rear door is adopted to eliminate a structural limitation of the vehicle to which the opposite swing doors are applied without a B-pillar. Therefore, even though a load exceeding strength of the ceiling or strength of the side door is applied, it is possible to prevent the front door and the rear door from sagging and being excessively separated and meet regulations related to the strength of the ceiling and side door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
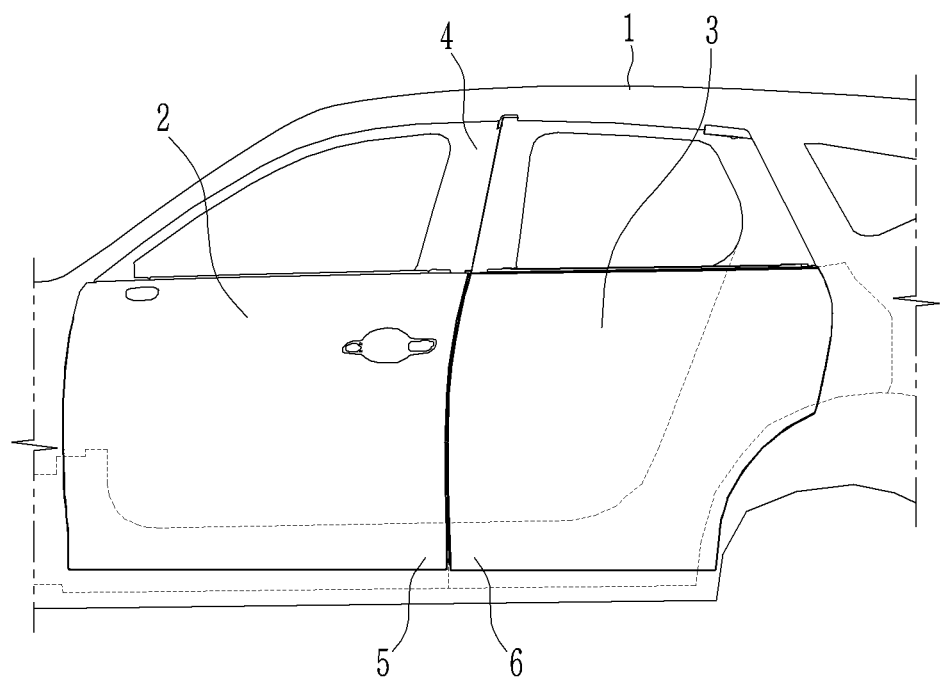
FIG. 1 is a side view exemplarily illustrating a vehicle to which opposite swing doors are applied with a B-pillar in the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements having the same configurations in the several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a door connecting device for a vehicle according to various exemplary embodiments of the present disclosure will be described in detail with reference to the accompanying drawings.

Figure 2:
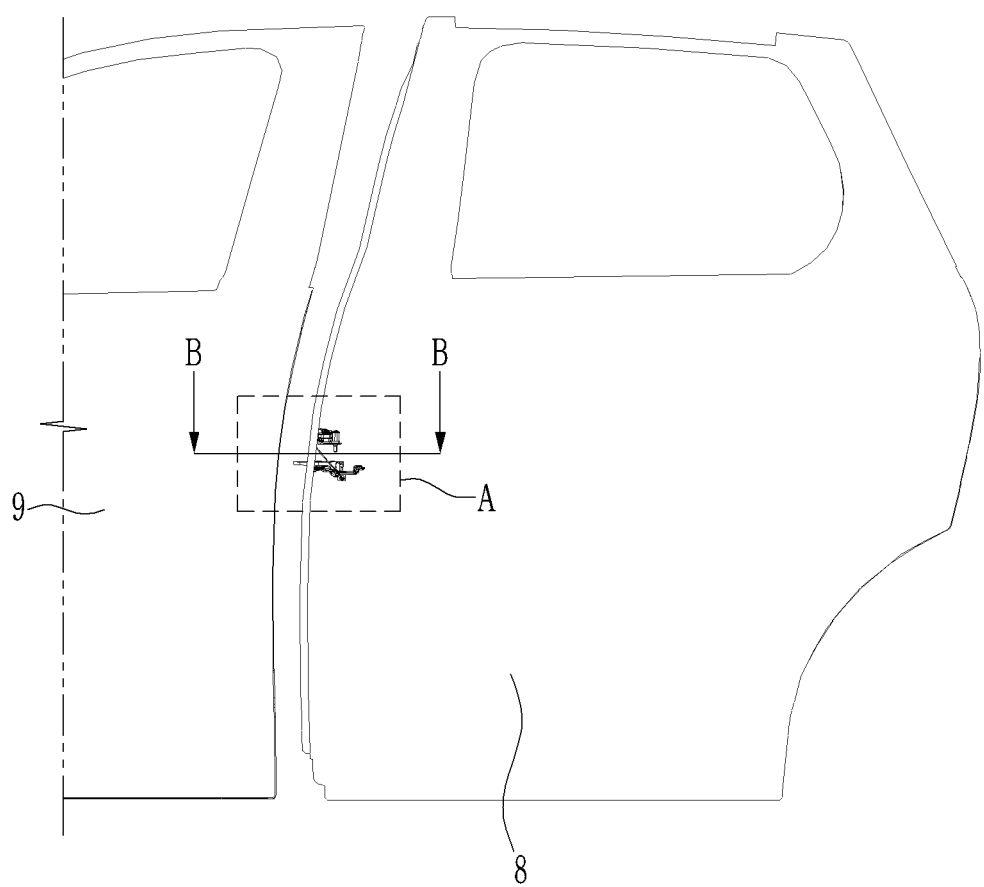
FIG. 2 is a side view exemplarily illustrating a vehicle to which a door connecting device for a vehicle according to the exemplary embodiment of the present disclosure is applied.
Figure 3:
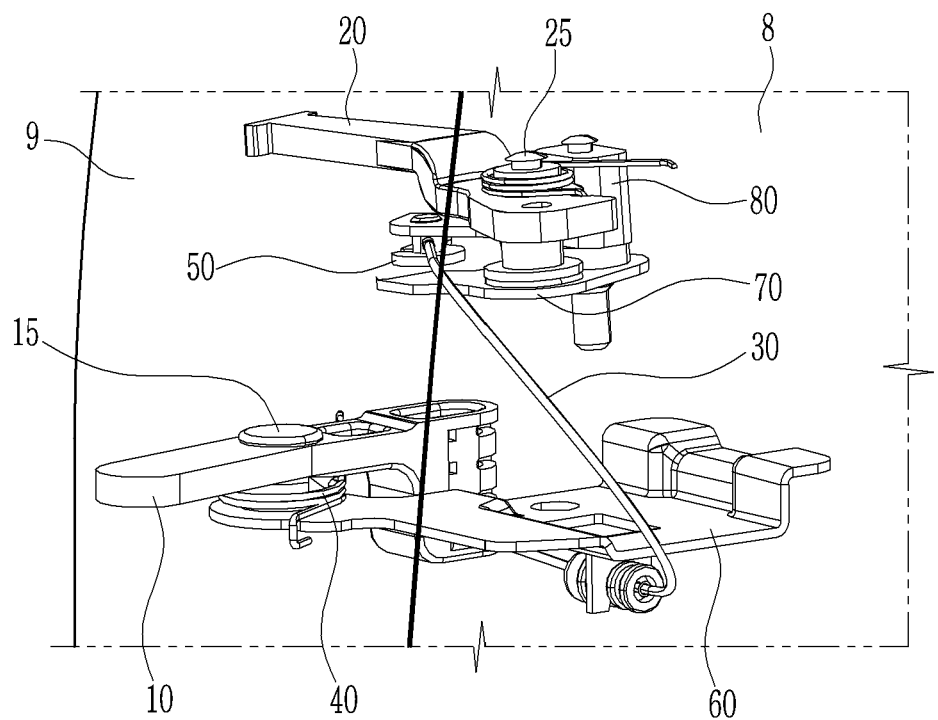
FIG. 3 is a view exemplarily illustrating a state of the door connecting device for a vehicle according to the exemplary embodiment of the present disclosure when a rear door is opened.
Figure 4:
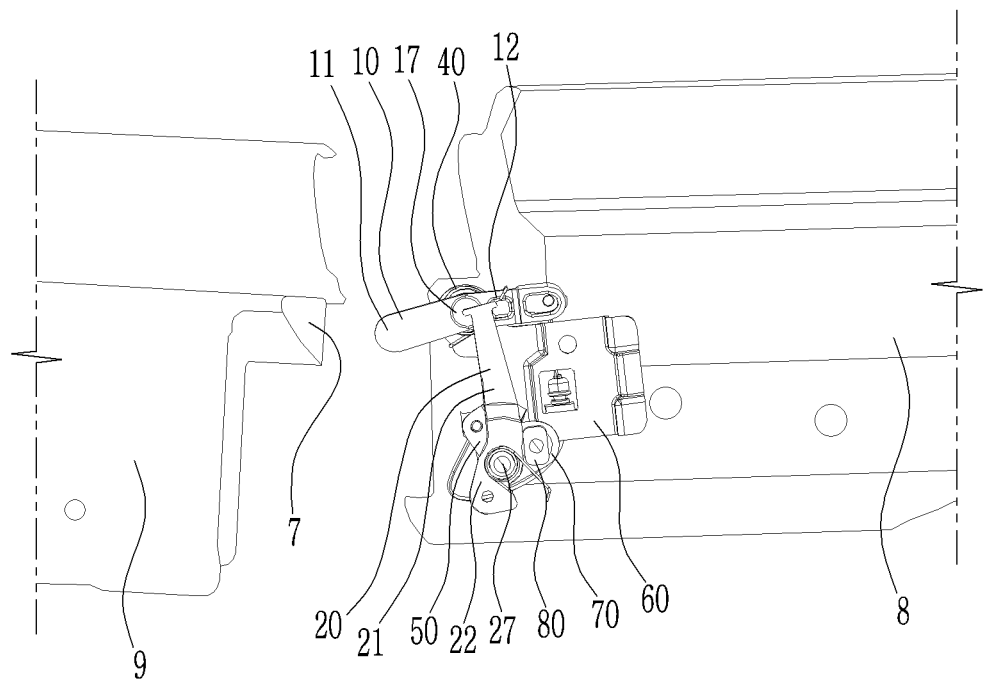
FIG. 4 is a view exemplarily illustrating a state of the door connecting device for a vehicle according to the exemplary embodiment of the present disclosure when the rear door is opened when viewed from above.

FIG. 2 is a side view exemplarily illustrating a vehicle to which a door connecting device for a vehicle according to the exemplary embodiment of the present disclosure is applied, FIG. 3 is a view exemplarily illustrating a state of the door connecting device for a vehicle according to the exemplary embodiment of the present disclosure when a rear door is opened, and FIG. 4 is a view exemplarily illustrating a state of the door connecting device for a vehicle according to the exemplary embodiment of the present disclosure when the rear door is opened when viewed from above.

Referring to FIG. 1, a door connecting device for a vehicle according to various exemplary embodiments of the present disclosure may be applied to a structure configured to connect a rear door 8 and a front door 9 and provided at a center portion, i.e., part 'A' between the rear door 8 provided at a rear side and the front door 9 provided at a front side based on a longitudinal direction of a vehicle. Furthermore, the door connecting device may be applied to the structure in which the rear door 8 is opened or closed while moving in a direction toward the inside or outside of the vehicle and sliding forward or rearward in the longitudinal direction of the vehicle.

Referring to FIG. 3 and FIG. 4, a door connecting device for a vehicle according to various exemplary embodiments of the present disclosure is applied to a vehicle including opposite swing doors including the rear door 8 and the front door 9 and configured to be opened or closed as the rear door 8 and the front door 9 move relative to each other. The door connecting device includes a lever 10, a catcher 20, and a cable 30.

The configuration has been described in which the door connecting device for a vehicle according to the exemplary embodiment of the present disclosure is applied to the rear door 8, but the present disclosure is not limited thereto. The door connecting device may be applied to the front door 9.

The lever 10 is rotated by a relative movement between the rear door 8 and the front door 9. The lever 10 may be mounted on a lever bracket 60 provided on the rear door 8 and rotatably coupled to a first rotation shaft 17 provided on the lever bracket 60.

In a state in which the rear door 8 and the front door 9 are opened, i.e., in a state in which the rear door 8 and the front door 9 are not coupled, a first end portion 11 of the lever 10 protrudes toward the front door 9, and a second end portion 12 of the lever 10 is connected to the cable 30.

A portion between the first end portion 11 and the second end portion 12 of the lever 10 is coupled to the first rotation shaft 17 provided on the lever bracket 60 so that the lever 10 may rotate about the rotation shaft. An elastic member 40 may be provided on the rotation shaft. The elastic member 40 may provide an elastic force to allow the first end portion 11 of the lever 10 to protrude toward the front door 9 when the rear door 8 and the front door 9 are opened. In the instant case, the elastic member 40 may be a coil spring wound around the rotation shaft.

The catcher 20 may be provided on the rear door 8 and rotate in a rotation direction of the lever 10 in conjunction with the rotation of the lever 10. The catcher 20 may be mounted on the catcher bracket 70 provided on the rear door 8 and rotatably coupled to a second rotation shaft 27 provided on the catcher bracket 70.

In the state in which the rear door 8 and the front door 9 are opened, i.e., in the state in which the rear door 8 and the front door 9 are not coupled, a first end portion 21 of the catcher 20 protrudes toward the outside of the rear door 8, and a second end portion 22 of the catcher 20 is connected to the cable 30.

The lever 10 and the catcher 20 may be provided at an end portion of the rear door 8, and the lever 10 may be disposed below the catcher 20.

The cable 30 is configured to connect the lever 10 and the catcher 20 and transmit a rotation force to the catcher 20 when the lever 10 rotates.

Figure 5:
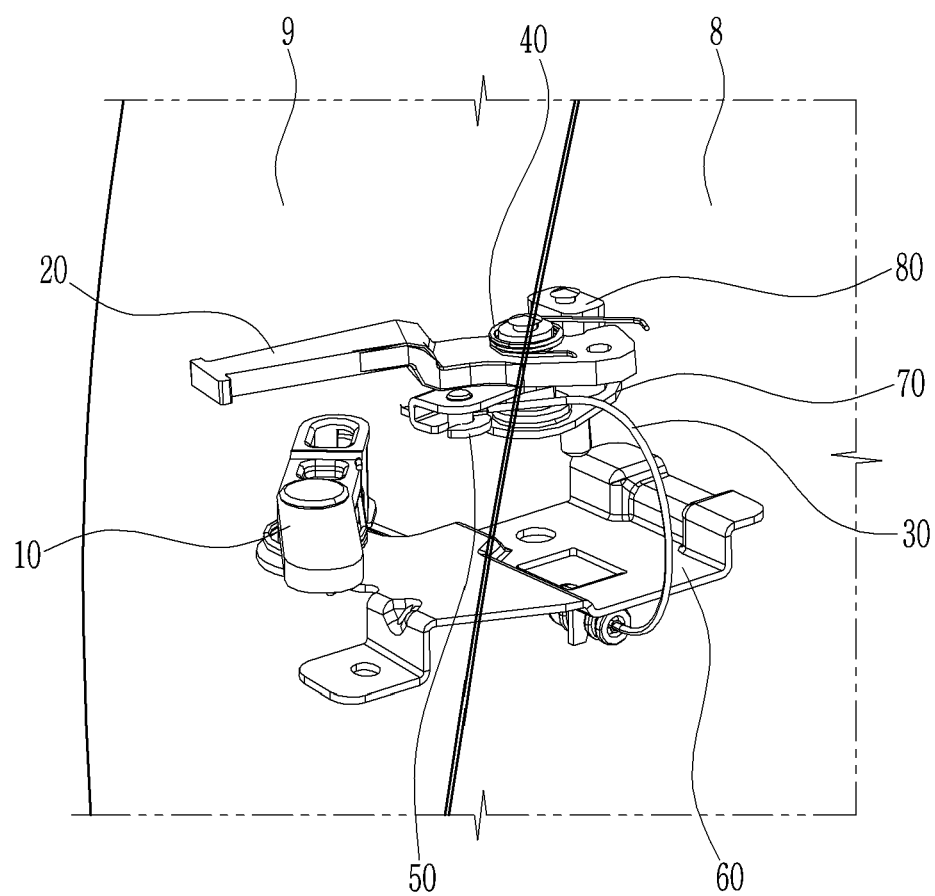
FIG. 5 is a view exemplarily illustrating a state of the door connecting device for a vehicle according to the exemplary embodiment of the present disclosure when the rear door is closed.
Figure 6:
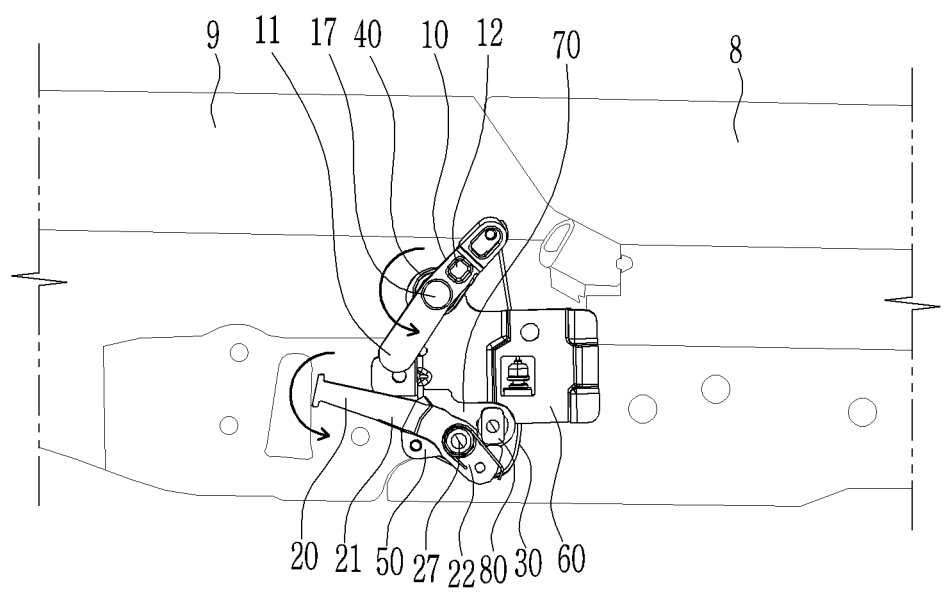
FIG. 6 is a view exemplarily illustrating a state of the door connecting device for a vehicle according to the exemplary embodiment of the present disclosure when the rear door is closed when viewed from above.

FIG. 5 is a view exemplarily illustrating a state of the door connecting device for a vehicle according to the exemplary embodiment of the present disclosure when the rear door is closed, and FIG. 6 is a view exemplarily illustrating a state of the door connecting device for a vehicle according to the exemplary embodiment of the present disclosure when the rear door is closed when viewed from above.

Referring to FIG. 4, FIG. 5 and FIG. 6, when the rear door 8 and the front door 9 are coupled, the first end portion 11 of the lever 10 comes into contact with an end portion of the front door 9 and rotates counterclockwise.

Two opposite end portions 11 and 12 of the lever 10 may each have a rounded shape. In a state in which the rear door 8 and the front door 9 are separated, the first end portion 11 of the lever 10, which protrudes toward the front door 9, comes into contact with the end portion of the front door 9, and the lever 10 rotates counterclockwise about the first rotation shaft 17 provided on the lever bracket 60. Furthermore, the second end portion 12 of the lever 10 also rotates counterclockwise.

In the instant case, the cable 30 connected to the second end portion 12 of the lever 10 is pulled by the rotation of the second end portion 12 of the lever 10 in the counterclockwise direction, and the second end portion 22 of the catcher 20 is rotated counterclockwise by the cable 30. Furthermore, when the catcher 20 rotates counterclockwise about the second rotation shaft 27 provided on the catcher bracket 70, the second end portion 22 of the catcher 20 also rotates counterclockwise.

In the state in which the rear door 8 and the front door 9 are coupled, the first end portion 21 of the catcher 20 protrudes toward the front door 9. In the instant case, the first end portion 21 of the catcher 20 may be inserted into an insertion hole 7 provided at the end portion of the front door 9, and the front door 9 may be supported in the insertion hole 7 by the catcher 20. Therefore, the structure for connecting and coupling the front door 9 and the rear door 8 is completed.

Meanwhile, a holder 50 may be provided at the first end portion 21 of the catcher 20, and the cable 30 is connected to the holder 50. When the cable 30 is pulled, the holder 50 may rotate. That is, when the cable 30 connected to the lever 10 is pulled by the rotation of the lever 10, the cable 30 rotates the holder 50, and the catcher 20 may be rotated by the rotation of the holder 50.

Figure 7:
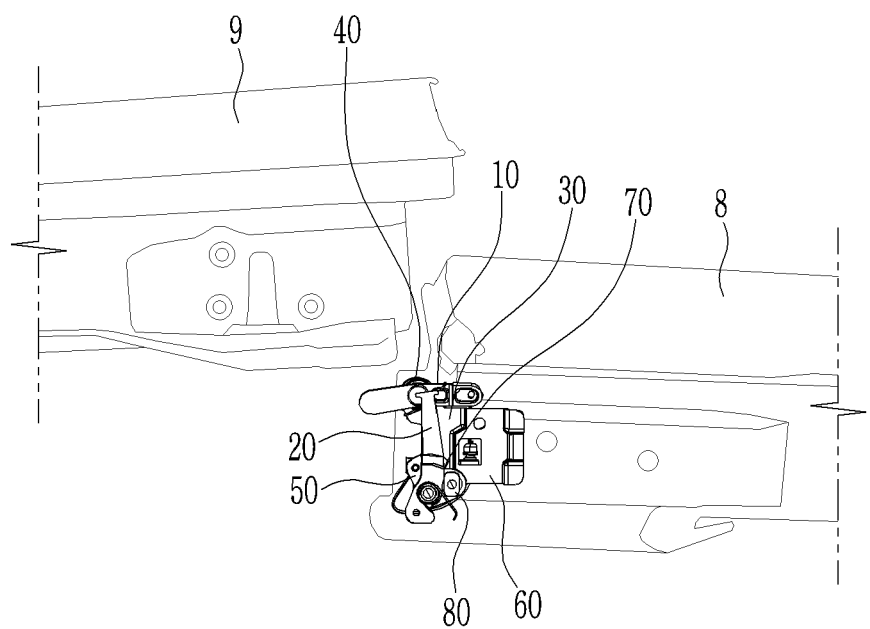
FIG. 7 is a view exemplarily illustrating a state of the door connecting device for a vehicle according to the exemplary embodiment of the present disclosure when a front door is opened when viewed from above.

FIG. 7 is a view exemplarily illustrating a state of the door connecting device for a vehicle according to the exemplary embodiment of the present disclosure when the front door is opened when viewed from above.

In the case of the structure of the door connecting device described with reference to FIG. 3, FIG. 4, FIG. 5 and FIG. 6, a process in which the rear door 8 moves relative to the front door 9 in the state in which the front door 9 is fixed so that the doors are completely coupled. In the case of the structure illustrated in FIG. 7, the front door 9 moves relative to the rear door 8 in the state in which the rear door 8 is fixed so that the doors are completely coupled. The state in which the doors are completely coupled by the movement of the front door 9 is identical to that illustrated in FIG. 6. Therefore, the door connecting device will be described with reference to FIGS. 7 and 6.

Referring to FIGS. 7 and 6, when the rear door 8 and the front door 9 are coupled, the front door 9 rotates in the state in which the rear door 8 is fixed so that the end portion of the front door 9 comes into contact with the first end portion 11 of the lever 10, and the lever 10 rotates counterclockwise. In the state in which the rear door 8 and the front door 9 are separated, the first end portion 11 of the lever 10, which protrudes toward the front door 9, comes into contact with the end portion of the front door 9, and the lever 10 rotates counterclockwise about the first rotation shaft 17 provided on the lever bracket 60. Therefore, the second end portion 12 of the lever 10 also rotates counterclockwise.

The configuration in which the catcher 20 is rotated by the rotation of the lever 10, the configuration in which to couple the doors, the end portion 21 of the catcher 20 is inserted into the insertion hole 7 provided at the end portion of the front door 9 so that the structure for coupling and connecting the front door 9 and the rear door 8 is completed, and the configuration in which the holder 50 is additionally provided, and the catcher 20 may be rotated by the rotation of the holder 50 are identical to the configurations described with reference to FIG. 4, FIG. 5 and FIG. 6. Therefore, a detailed description thereof will be omitted.

Figure 8:
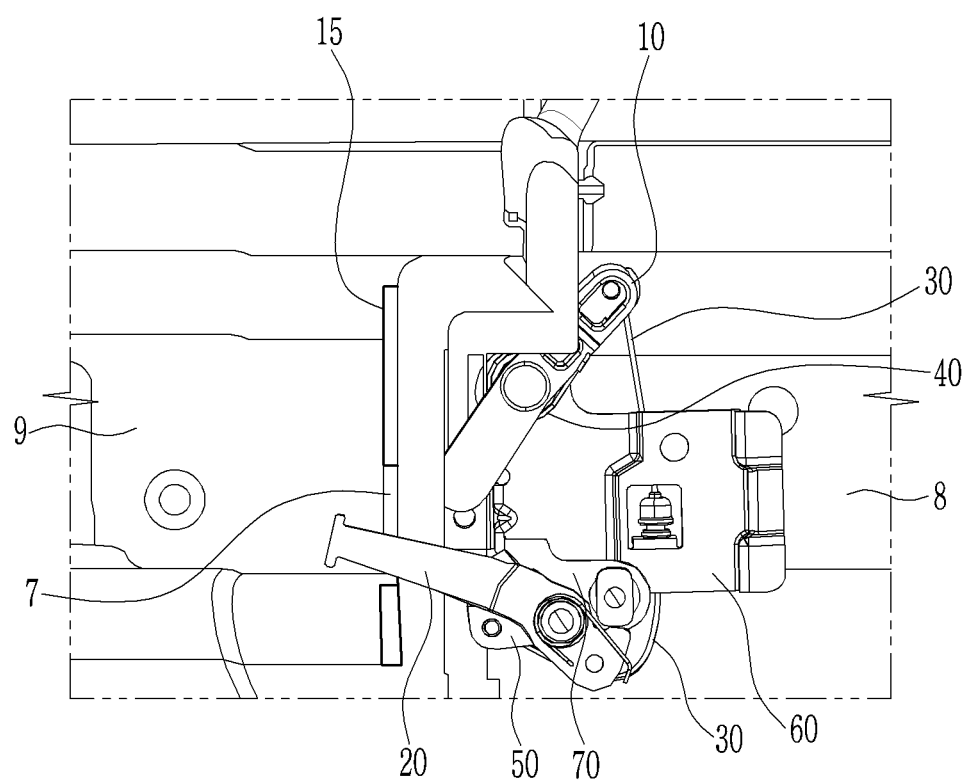
FIG. 8 is a view exemplarily illustrating a state in which the front door and the rear door of the door connecting device for a vehicle according to the exemplary embodiment of the present disclosure are coupled, and a reinforcement is provided on the front door.

FIG. 8 is a view exemplarily illustrating a state in which the front door and the rear door of the door connecting device for a vehicle according to the exemplary embodiment of the present disclosure are coupled, and a reinforcement is provided on the front door.

Referring to FIG. 8, when the front door 9 and the rear door 8 are coupled, the lever 10 and the catcher 20 may rotate, and the end portion 21 of the catcher 20 may be inserted into the insertion hole 7 provided at the end portion of the front door 9. A reinforcement 15 may be provided inside the insertion hole 7.

Because the reinforcement 15 is provided in the insertion hole 7 of the front door 9, i.e., provided inside a front door internal panel, the catcher 20 is caught by the reinforcement 15 disposed inside the front door internal panel when a load is applied by an external force in a direction in which the front door 9 and the rear door 7 are separated. Therefore, it is possible to prevent the front door 9 and the rear door 7 from being excessively separated and resist against the external force. Therefore, it is possible to meet regulations related to the strength of the side door and ceiling.

As described above, according to the exemplary embodiment of the present disclosure, the structure for connecting the front door and the rear door is adopted to eliminate a structural limitation of the vehicle to which the opposite swing doors are applied without a B-pillar. Therefore, even though a load exceeding strength of the ceiling or strength of the side door is applied, it is possible to prevent the front door and the rear door from sagging and being excessively separated and meet regulations related to the strength of the ceiling and side door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door connecting apparatus for a vehicle to which opposite swing doors including a rear door and a front door is applied, the opposite swing doors being configured to be opened or closed by a relative movement between the rear door and the front door, the door connecting apparatus comprising:
a lever rotatably mounted on one of the front door and the rear door and configured to be rotated by the relative movement between the rear door and the front door;
a catcher rotatably mounted on the one of the front door and the rear door and configured to rotate in conjunction with a rotation of the lever; and
a cable connecting the lever and the catcher and configured to transmit a rotation force caused by the relative movement to the catcher when the lever rotates,
wherein the cable is configured to be pulled by the rotation of the lever and rotate the catcher in a rotation direction of the lever,
wherein the cable is connected to a holder provided at a first end portion of the catcher, and
wherein when the cable is pulled, the holder rotates, and the holder rotates the catcher.

2. The door connecting apparatus of claim 1,
wherein the lever includes a first end portion and a second end portion, the second end portion of the lever connected to the cable, and
wherein when the rear door and the front door are opened, the first end portion of the lever protrudes toward the front door.

3. The door connecting apparatus of claim 2,
wherein when the rear door and the front door are coupled, the lever operates so that the first end portion of the lever rotates while coming into contact with an end portion of the front door.

4. The door connecting apparatus of claim 3,
wherein the lever is configured to rotate about a first rotation shaft disposed between the first end portion and the second end portion of the lever, and
wherein an elastic member is provided on the first rotation shaft, and provides an elastic force to allow the first end portion of the lever to protrude toward the front door when the rear door and the front door are opened.

5. The door connecting apparatus of claim 4, wherein the elastic member is a coil spring wound around the first rotation shaft.

6. The door connecting apparatus of claim 1,
wherein the lever is rotatably provided on a lever bracket connected to the first rotation shaft, and
wherein the lever bracket is provided on the rear door.

7. The door connecting apparatus of claim 1,
wherein the catcher is provided on a catcher bracket connected to a second rotation shaft at a second end portion of the catcher, and
wherein the catcher bracket is provided on the rear door.

8. The door connecting apparatus of claim 7, wherein the first end portion of the catcher rotates about the second rotation shaft at the second end portion of the catcher to be inserted into an insertion hole provided at an end portion of the front door when the rear door and the front door are coupled.

9. The door connecting apparatus of claim 8, wherein a reinforcement is provided inside the insertion hole and supports the first end portion of the catcher.

10. The door connecting apparatus of claim 1, wherein first and second opposite end portions of the lever each have a rounded shape.

11. The door connecting apparatus of claim 1,
wherein the lever and the catcher are provided at an end portion of the rear door, and
wherein the lever is disposed below the catcher.

* * * * *